United States Patent [19]

Messner

[11] Patent Number: 4,878,288
[45] Date of Patent: Nov. 7, 1989

[54] PRESS

[75] Inventor: Helmut Messner, Frasnacht, Fed. Rep. of Germany

[73] Assignee: Bruderer AG, Switzerland

[21] Appl. No.: 203,564

[22] Filed: May 25, 1988

Related U.S. Application Data

[63] Continuation of Ser. No. 39,101, Apr. 16, 1987, abandoned.

[30] Foreign Application Priority Data

Apr. 18, 1986 [CH] Switzerland ............... 01575/86

[51] Int. Cl.$^4$ ............................................. B23Q 3/155
[52] U.S. Cl. ....................................... 29/568; 72/446; 83/563
[58] Field of Search ............... 29/568; 72/446, 462, 72/448, 447; 83/698, 700, 701, 563, 679; 414/626, 753

[56] References Cited

U.S. PATENT DOCUMENTS

| | | | |
|---|---|---|---|
| 3,745,646 | 7/1973 | Kristiansson | 29/568 |
| 3,816,904 | 6/1974 | Herb | 29/568 |
| 4,140,449 | 2/1979 | Takeshi et al. | 425/78 |
| 4,205,427 | 6/1980 | Koch et al. | 29/568 |
| 4,304,041 | 12/1981 | Kline et al. | 29/568 |
| 4,387,502 | 6/1983 | Dom | 29/568 |
| 4,587,716 | 5/1986 | Bytow | 29/568 |
| 4,624,044 | 11/1986 | Bredon | 29/568 |
| 4,649,622 | 3/1987 | Scott | 29/568 |

FOREIGN PATENT DOCUMENTS

| | | | |
|---|---|---|---|
| 128487 | 12/1984 | European Pat. Off. | 29/568 |
| 1748211 | 7/1957 | Fed. Rep. of Germany . | |
| 2306945 | 8/1974 | Fed. Rep. of Germany | 74/446 |
| 2523442 | 12/1976 | Fed. Rep. of Germany . | |
| 2740042 | 3/1979 | Fed. Rep. of Germany . | |
| 3036333 | 2/1984 | Fed. Rep. of Germany | 74/446 |
| 57-199531 | 12/1982 | Japan | 29/568 |
| 106630 | 6/1985 | Japan | 72/446 |

OTHER PUBLICATIONS

Machinery and Production Engineering, vol. 143, Nr. 3667, Mar. 20, 1985, Horton Kirby, Kent (GB) "Quick Die Change System Speeds Press Set Up Times", p. 91.
Werkstattstechnik, Zeitschrift fur Industrielle Fertigung, Band 73, Nr. 6, Jun. 6, 1983, Berlin, "Werkzeugwechselsystem fur Schneidpressen", pp. 371, 372.

Primary Examiner—William Briggs
Attorney, Agent, or Firm—Ostrolenk, Faber, Gerb & Soffen

[57] ABSTRACT

A bearing element (30) for a handling device (31) whose gripper can be moved in a plane parallel to the plane of the holding apparatus (8, 11) and at right angles to its direction of movement, from a rest position to at least one position for removal of the tool (9, 12), and from this position to a transfer position (31″, 32″) in which the tool (9, 12) can be transferred to a magazine (21–24), is attached to a stand (7) of a press (1), in particular a high-speed press, the said stand carrying a holding apparatus (8) for a tool (9).

18 Claims, 11 Drawing Sheets

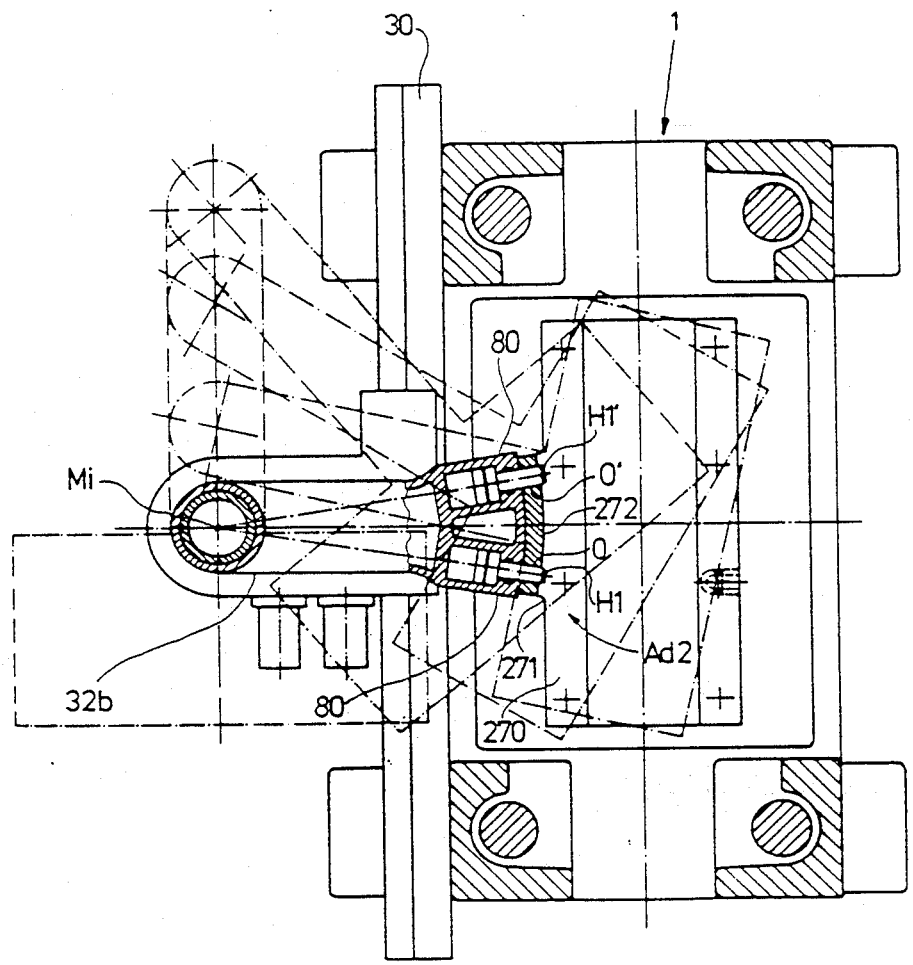
Fig. 4c/d

PRESS

This is a continuation of application Ser. No. 39,101 filed on Apr. 16, 1987, now abandoned.

BACKGROUND OF THE INVENTION

The invention relates to a press having a stand and a tool consisting of at least two parts, on which stand a first holding apparatus for holding a first tool part is mounted. Relative to the first holding apparatus, a second holding apparatus for the counter-tool part can be moved by means of a drive. A handling device having at least one gripping arm is mounted on the said press by means of a bearing element. The invention furthermore relates to a holding device for a tool to be used in this press.

A trimming press analogous to the press stated at the outset is disclosed in German Pat. No. 3,036,333, in which the press has a counter-tool which can be moved horizontally with respect to a stationary tool. The bearing element of the handling device encloses the drive, is located on one of the guide columns of the press, which is also designed as the drive shaft, and is rotatable stepwise through 90° around this column. Out of a total of four gripping arms, two project beyond the outer contour in each of the positions. Out of the four gripping arms, one is in a position for accepting a workpiece which has been produced by a die casting machine and is to be burred, and one is in an insertion position for inserting the workpiece into the press, and a cooling position and a rest or empty position is provided in between.

While in trimming presses only the relatively weak burrs of the workpieces have to be cut off, and this process takes place at relatively long intervals determined by the die casting machine, the situation at higher speeds, particularly in, for example, punch presses, is quite different. There, in fact, it is often necessary to punch through thick metal sheets, and this may take place at very high frequencies. As a result, all parts of the punch press are subjected to strong forces which to date have made it inadvisable to provide handling devices on the press. Furthermore, there does not appear to be any demand for this in automatic punch presses since the "workpieces" are fed in the blank state, i.e. as sheet, by a feed mechanism, whereas the finished workpiece is generally removed without a handling device.

However, what are difficult to handle in such presses and similar ones are the tools themselves. To date, there are two different changing systems on the market. Either the tools are lifted out on roller conveyors (since their weight is generally considerable), for example on a rotary table which is fastened to the floor in front of the press, forms the receiver and blocks access at this point; or the tool emerges, together with part of the table-like stand, on a trolley which can be moved laterally on rails in front of the press. In this case too, the space in front of the press must be kept free for this trolley, and this is particularly inconvenient because, for example, punch presses, particularly at high punching frequencies, are often surrounded by a sound-insulating housing, which in this case has to be specially designed to permit passage of the trolley or acceptance of the tool from the latter.

JP-A-57 199 531 discloses a press of the type stated at the outset. There, both the press itself and the receiving means for a plurality of tools were housed on a common stand. The particular tool desired needed only to be brought into a position opposite the tool holder, whereupon a gripping arm operated by a cylinder pushed it onto the holder. The reverse procedure was used for removing the tool.

Although this known embodiment appeared simple and uncomplicated, it had a large number of disadvantages. The higher the production rate of the press (without even considering true high-speed presses), the greater the vibration the tools in the receiving means had to be subjected to. Since the receiving means had a complicated movement mechanism resembling that of a compound slide (and this with tools weighing several tons), this mechanism was of course rapidly worn down at high punching frequencies. Moreover, the number of tools which could be housed in such a receiving means was of course extremely limited. Another disadvantage was that access to the machine (for example for maintenance work) was very difficult since the entire rear of the press and also part of the sides were occupied by the receiving means.

SUMMARY OF THE INVENTION

The object of the invention is to provide a compact unit which, even under the special conditions which apply in the case of rapidly operating presses, in particular punch presses, permits the use of a handling device without it being necessary to accept disadvantages with regard to accessibility of the press.

This object is achieved, according to the invention, by a press having a stand and a tool consisting of at least two parts, on which stand a first holding apparatus for holding a first tool part is mounted, relative to which apparatus a second holding apparatus for the counter-tool part can be moved with the aid of a drive, on which press a handling device which has at least one gripping arm is supported by means of a bearing element which is mounted exclusively on the stand carrying the first holding apparatus, and the gripper can be brought, in a plane parallel to the plane of the holding apparatuses and at right angles to their direction of movement, from a rest position to a position for transfer to a magazine, wherein (a) a lifting apparatus (69, 139, 84, 176) is provided for the gripping arm (32, 32a, 32b, 132), by means of which lifting apparatus the tools (9, 12, 109, 112, 209, 212, 312) gripped by the gripper (38, H, 138, 238, H1, H', H2) can be raised; and (b) between the rest position and the transfer position, the gripper (38, H, 138, 238, H1, H1', H2) can be moved into at least one tool-removal position, in which at least one of the two tools (9, 12, 109, 112, 209, 212, 312) connected to the holding apparatuses (8, 11) can be removed from the holding apparatus (8, 11) after its means (35) of connection to the holding apparatus has been detached.

Because the gripping arm can now be raised, a particular disadvantage of the known sliding gripper is avoided, since the tool could in fact only be pushed out of its fastening on the tool holder when the fastening slots —which are generally T-shaped —were above the level of the stand. It was therefore necessary for the tool holder to be of a particular height, which on the one hand meant a waste of space and on the other hand did not improve accessibility. However, for handling too, the exclusively sliding movement was a disadvantage since metal chips frequently presented an obstacle to the sliding movement and caused undesirable abrasion and sometimes also completely prevented sliding.

Providing an intermediate position (tool removal position) makes it possible to house the receiving means at a more remote place, i.e. not directly on the same machine stand as the press, with the result that the receiving means
can be of any size and
can be kept free of vibrations, and moreover
accessibility to it and to the press is improved.

Specialists have to date considered it impossible to mount a handling device on a punch press with a high production rate, owing to forces on such a machine which in any case are difficult to control, and have therefore retained the rotary table or trolley constructions described above, despite the disadvantages. However, the design according to the invention permits precisely such a device to be mounted, ensuring more stable mounting than in the case of the prior art according to German Pat. No. 3,036,333; moreover it is possible to keep the floor in front of the machine free. Where a sound-insulating housing is provided, it is at least simplified since there is no need to consider the possibility of a tool-holding trolley which travels past. The free space in front of the punch press provides easier access to the press. Finally, there is no longer any restriction in terms of the space for housing the known rotary table or the rails for the trolley; instead, a more compact unit is obtained which occupies less space, is more flexible with regard to the set-up of the punch press and furthermore entails less danger, since travelling trolleys always constitute a danger for the personnel.

The "relative movement of the two holding apparatuses" is mentioned again and again here and is intended to express the fact that only the relative movement, per se, of the two tools is of importance for the punching process, and it would therefore be possible for both tools to be driven for one movement, although as a rule one of them, generally the lower one (for vertical travel), is stationary.

It is advantageous if the punching movement of the holding apparatuses which can be moved relative to one another takes place with the aid of guide means in the vertical direction —in contrast to the stated German Patent but in conformity with the conventional embodiment for punch presses —and if the handling device is mounted underneath the holding apparatuses for the punching tool, on the stand. In view of the vibrations which occur in a punch press, it is in fact particularly advantageous if the center of gravity of the entire unit is as low as possible, which is achieved in this way.

Particularly because of the resulting vibrations, it is also advantageous if the handling device is elastically mounted. However, since punch presses themselves are generally elastically mounted, it is advantageous if an elastic mounting system is provided for the handling device and stand together and possesses dimensions depending on the additional load on one side. It may prove expedient for the elastic mounting system under the stand to possess greater dimensions on the side which faces the handling device than on the opposite side.

Although on the one hand the elastic mounting system is very important during operation of the press, particularly in the case of high-speed high-performance presses, on the other hand it may result, during tool change, in the elastically supported part inclining toward whichever is the heavier side during movement of the handling device, and this may have an adverse effect on operation —for example when the tool is being laid on the receiver. A preferred remedy to this problem is to provide a locking means for preventing an elastic movement.

During operation of the press, while all parts are subjected to vibrations, it is advantageous if all parts are as close as possible to the center of gravity; for this reason, provision can be made for at least one gripping arm in the rest position (which in fact has to assume during operation of the press) is at least substantially within an outer contour line formed by the cross-section of the press and by the housing or by the bearing element of the handling device.

As already mentioned, one problem in punch presses is the noise which arises as a result of the large forces which have to be applied. It is therefore advantageous that the handling device, at least in its rest position, preferably also at least in the two-removing position and in particular in all positions, is housed inside a sound-insulating housing surrounding the punch press. If it is outside the housing in only a single position, at least partially, for example the gripping arm, the housing must be provided with doors, compartments or even openings, which on the one hand makes the housing more complicated and on the other hand detracts from its purpose.

This is particularly advantageous if the receiving means too is located inside the sound-insulating housing since this not only most satisfactorily ensures that this housing is tight but also permits the distances for the handling device to be kept small, which in turn helps to make it compact. Furthermore, the tools in this case are always kept at the generally elevated temperature inside the housing, which has an advantageous effect on the precision of manufacture from the very first manufacturing operations onward.

Provision of a clamping means with the aid of which the gripping arm can be firmly attached to the stand in the rest position contributes to further improvement in the stability during operation of the punch press. This can be achieved, for example, if the gripping arm is held under tension by its drive, generally a fluidic drive, and at the same time engages the particular stationary tool part firmly connected to the stand, so that, in order to pull out the tool, it may not first be brought from a particular rest position to the tool.

Since many presses are constructed very compactly and little space is available between the guide means (generally guide columns) for the tool movement, a simple swivel movement of the gripping arm is not possible; for this reason, it is advantageous if at least one sliding guide is provided for the gripper, and, preferably, the bearing element is designed as a sliding guide running along the stand and parallel to the plane of the holding apparatus. Moreover, the gripper is preferably rotatable about an axis running parallel to the direction of movement of the holding apparatuses for the punch tool, which can be moved relative to one another, in particular if the said gripper is rotatable from a rest position projecting into the punch press to a tool-removal position pointing at least approximately along the path of the sliding guide. This makes it possible to provide for very restricted space conditions, by virtue of the fact that a common control apparatus assigned to the sliding movement and the rotating movement is provided, by means of which the gripper can be moved essentially along a straight line between guide columns of the press, into the tool-removal position.

If the gripping arm is displaceable with the aid of a sliding guide parallel to the plane of the holding apparatuses of the tool, two directions are possible in this plane: the gripping arm is displaceable either transverse to the feed direction of the sheet to be punched in the case of a punch press, for example by a telescopic guide, and/or parallel to the said direction, the latter being preferred. In this latter case, the sliding guide is preferably attached to the stand in order to displace the entire handling device. If the gripper is also rotatable around an axis running parallel to the direction of movement of the holding apparatuses of the punching tool, which can be moved relative to one another, the tool can be pulled out by sliding and simultaneous rotation. For this purpose, coordination of these two movements is provided by the control means so that the free end of the gripping arm, but especially the tool itself, moves along a straight line before arriving at the tool-removal position. The program control unit can —particularly in the case of a purely mechanical drive —also consist of simple coupling of the two drives. It is preferable if the gripping arm can be brought from a rest position projecting into the punch press to a tool-removal position pointing at least approximately along the path of the sliding guide, since in this case the gripping arm still avoids projecting beyond the outer contour of the punch press and its bearing element. Since, of course, it takes up the tool-removal position only when the punch press is not operating (for which reason it is advantageous to couple the control of the press drive with that of the device drive so that at any time only one or the other is switched on), the last-mentioned characteristic is important not because of the machine vibrations but because as a result (without a sound-insulating housing) the personnel are less endangered by the gripping arm and have to pay less attention to it, or because (in the case of a sound-insulating housing) a more compact design is obtained, permitting a smaller and hence cheaper sound-insulating housing.

In punch presses, there is of course always punchings. Because of the high operating frequency, it is not possible —in contrast, for example, to a trimming press —to remove these punchings, for example, by hand; this is also prevented by the small amount of space available in a punch press. Hence, such wastes could easily slide between the clamping surface of the holding apparatus and the tool, if a purely sliding movement were provided for the gripping arm. It is therefore advantageous if an axle running parallel to the plane of the holding apparatus for the punching tool is provided for the gripping arm, with the aid of which axle the particular punching tool can be lifted from its base.

Conventional handling devices for removing workpieces generally have movable gripper claws. Such a construction is of course also possible within the scope of the invention, although the construction can be simplified and made cheaper if the gripping arm possesses, at its free end, only one bracket, pin, or the like, of the particular tool-embracing hook, and preferably also a supporting surface which takes up the torque produced by the weight of the tool and which runs approximately at right angles to the plane of the tool.

Mounting a ring, recessed grip or the like on a tool itself entails additional processing costs, is not always possible and is furthermore not welcomed by the users. It is therefore expedient to provide a separate removal device for this purpose; this should be suitable for interaction with the gripping arm, and is therefore preferably designed, as an adapter for handling different tools, it possesses a fastening arrangement for the particular tool, which arrangement includes at least one fastening surface, and a bracket is provided which extends away from this fastening arrangement and is provided with a holding section which —after attachment to the tool —runs parallel to its edge.

BRIEF DESCRIPTION OF THE DRAWINGS

Further details are given in the following description of embodiments shown schematically in the drawings in which:

FIG. 3 is a cross-section through the bearing element of the handling device on the press, and the associated FIG. 4 of the same letter is a plan view of the handling device and is the section along the relevant line IV—IV through the press.

DETAILED DESCRIPTION OF THE EMBODIMENTS

Figure 1:
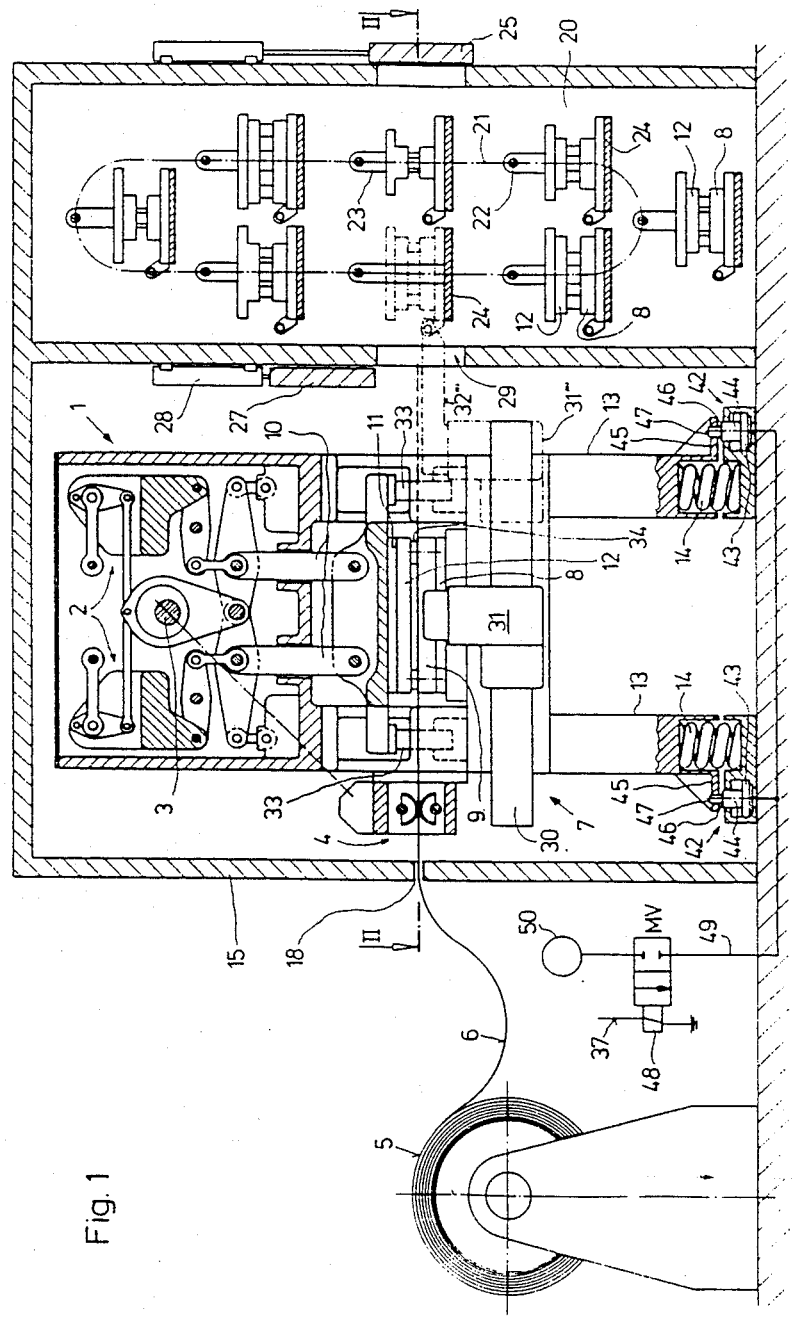
FIG. 1 shows a longitudinal section through the sound-insulating housing of a high-speed press, together with a connected tool receiver, along the line I—I of FIG. 2, parts of the press and the receiver likewise being cut away and a handling device on the press, with its sliding guide, being shown.
Figure 2:
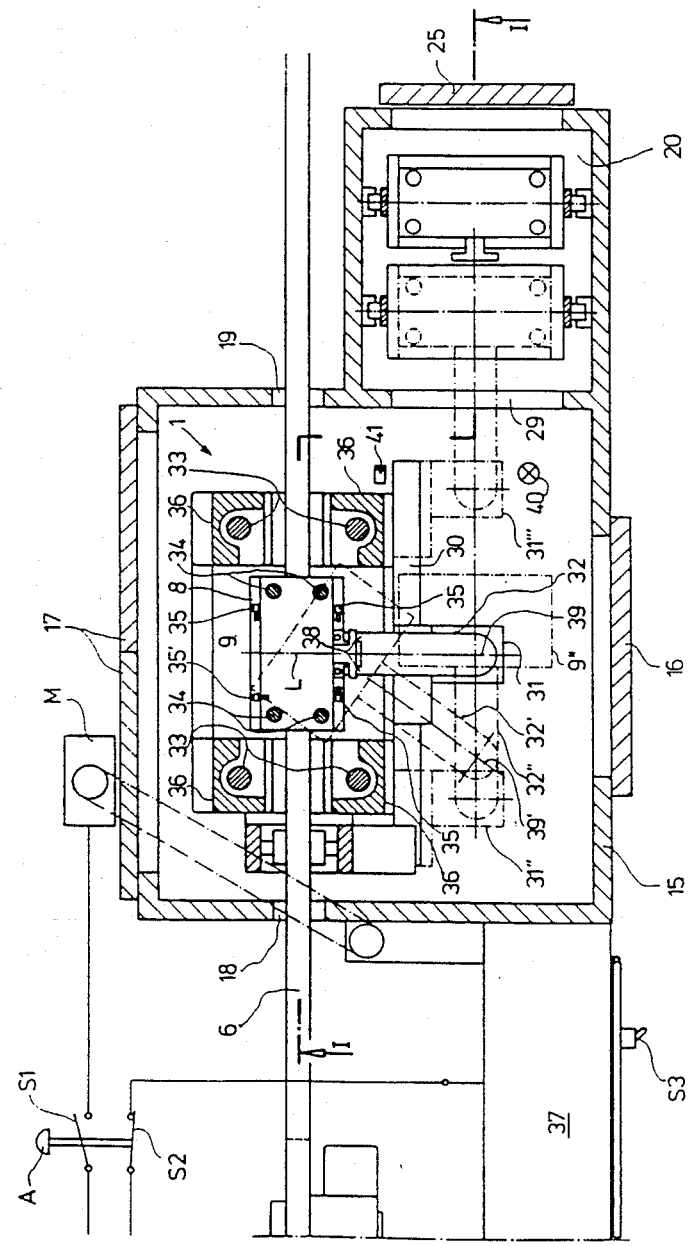
FIG. 2 is a cross-section through the sound-insulating housing according to FIG. 1, along the line II—II, parts of the press being cut away in order to illustrate the mode of operation of the handling device during tool change.

FIG. 1 and 2 show a high-speed punch press 1 to which the invention is preferably applied because the high production rate in such presses necessitates a faster tool change and therefore presents a problem in this respect. The press can be recognized as a high-speed punch press in that counterweights 2 are connected to an eccentric drive 3 which also drives a feed drive 4 for the punch sheet 6 rolled on a coil 5, as indicated by the dash-dot line. According to the diagram, the counterweights 2 are arranged as already described in US-A 4 156 387, but any other arrangement can of course also be used for this purpose.

The punch press 1 rests on a stand 7, on which a holding apparatus 8 for a stationary punch tool 9 is mounted. By means of the eccentric drive 3, a movable holding apparatus 11 to which a movable counter-tool 12 is attached is moved up and down in the vertical direction via slides 10. Of course, only the relative movement of the two tools 9, 12 is important, and it is just as possible for the upper one to be stationary and the lower one movable, as well as for both to be designed so that they are movable. Furthermore, although the vertical arrangement is preferred because the shocks produced by the punch press 1 are conducted away into the floor, the invention is not restricted to this.

Since these shocks are very strong in high-speed punch presses, the stand 7 is generally elastically mounted. For this purpose, supporting springs 14 are incorporated in the four legs 13 of the stand 7 (only two are visible in FIG. 1). The legs 13 are supported on a base as clearly shown in FIG. 1. The function of this spring system for the purposes of the invention will be explained below.

The punch press 1 is expediently accommodated in a sound-insulating housing 15, which is accessible from the rear through a door 16 (FIG. 2) and can be reached from the front through an entrance 17. The punch sheet 6 enters and emerges via narrow openings 18 and 19 respectively. Incidentally, FIG. 2 also shows the motor M which operates drives 3 and 4.

The parts described so far are present on a conventional high-speed punch press. Of course, the invention is in no way restricted only to such presses but is preferably applied to them because it is here that the problems to be resolved by the invention, arising from the high production rate, the rapid shock-like movement and the small amount of space in a sound-insulated housing 15, are particularly pronounced.

Precisely because of the high production rate, it is necessary to change the tools 9, 12 frequently if it is intended to use such a press 1 to produce even smaller numbers of pieces all at once. If tool change presents problems, as was the case in the past, the tools attached to the holding apparatuses 8, 11 (which incidentally may be of any known design) have to be used to produce a large number of pieces, which can only be delivered to the customer gradually, incurs storage costs in the meantime and ties up the capital invested.

For this reason, a tool magazine is located in an adjacent compartment 20 of the insulating housing 15, in which magazine a very wide variety of tools 9 and counter-tools 12 are placed one on top of the other on a continuous chain 21 (only indicated in FIG. 1) on axles 22 and on pallets 24 suspended on the said axles by means of support levers 23.

Inside the compartment 20 for storing tools, a heating unit (not shown) can be provided in order to keep the tools 9, 12 constantly at the working temperature, since the precision can be adversely affected during the punching process even by relatively small temperature differences. For this reason, compartment 20 is expediently closed on all sides and insulated, access being possible from the outside through a sliding door 25 which can be moved, for example, by a cylinder unit 26. Analogously, a door 27 which opens onto punch press 1 and has a cylinder unit 28 is provided, the said door closing an opening 29.

In order to permit the very heavy tools 9, 12 to be changed easily and rapidly, a bearing element 30 for mounting a handling device 31 is fastened to the stand 7 of the press 1. The handling device 31 possesses a gripping arm 32 shown in FIG. 2, by means of which at least one tool 9 or 12 can be moved from the punch press as soon as it has been detached from its holding apparatus 8 or 11. In this context, it is necessary to describe a few special features of such tools.

The movable holding apparatus 11 is provided at the sides with four guide columns 33 which are attached to it and move with it; furthermore, guide columns 34 are provided on the tools 9, 12. When the press 1 is in operation, the particular tool 9 or 12 is held firmly on its holding apparatus 8 or 11 with the aid of a detachable fastening means, for example by rotatable clamping jaws 35, three of which in FIG. 2 are shown in the unclamped state, i.e. rotated away from the tool 9, whereas clamping jaw 35' still grips and firmly holds the tool 9.

Since both tools 9, 12 are to be removed together, the handling device can grip both of them together, together with the columns 34, and then (after opening the clamping jaws 35) has to transport them out of the restricted space between the stand parts 36 surrounding the guide columns 33. This would be possible per se if the front end of the gripping arm were movable about two joints in the arm in such a way that it moved at least approximately along a straight line. Thus, the gripping arm would have to be divided into two parts by a joint and moreover, at its end which faces the bearing element 30, would have to rotate about a further joint.

It is advantageous to provide at least one sliding guide. This may be a telescopic guide or a guide as described below with reference to FIG. 3e, 4e; preferably, however, the bearing element 30 itself is in the form of a sliding guide. The handling device 31 is designed so that it is displaceable along this sliding guide 30, parallel to the plane of the holding apparatus 8, 11 or at right angles to the direction of movement of the movable tool 12 and its holding apparatus 11. To permit the bearing element 30 to rest on the stand 7, its center of gravity is relatively low when the punch simultaneously operates with a vertical direction of movement. On the other hand, mounting on the stand 7 makes it possible for the floor underneath the device 31 to be kept free so that an operator can approach the press 1 sufficiently closely.

The handling device 31 is designed so that it can be displaced along such a sliding guide 30, as shown in the remaining Figures, by means of a built-in motor or with the aid of a spindle (similar to a lathe) running along the sliding guide 30, the gripping arm 32 of the said handling device being rotatable, in the manner shown in FIG. 2, by a further drive likewise illustrated in FIG. 3, 4. With the aid of such a sliding guide 30, it is possible to assign these two drives a common control unit, for example with a microprocessor, in a control cabinet 37 (cf. FIG. 2), which controls the sliding movements of the handling device 31 and the swivel movements of its gripping arm 32 in the manner described below with reference to FIG. 2.

FIG. 2 shows, by means of solid lines, the position assumed by the handling device 31 during operation of the press 1, when the handling device itself is at rest. It is important that the handling device is not switched on during operation of the press 1. It is therefore expedient to provide an appropriate security means. This can be achieved, for example, if the handling device can only be switched on by pressing two switch buttons, in order to prevent accidental switching on in a manner similar to that used for switching recording heads in tape recorders. In another possible method, mutual mechanical or electrical locking of the switch is provided. This can most simply be effected in the manner shown in FIG. 2, where a main switch S1 for the press motor M is connected via a single actuating element A to a ready switch for the program control 37 of the handling device 31 in such a way that when one switch is switched on the other switch is switched off simultaneously.

As soon as the switches S1, S2 are in the position shown in FIG. 2, the handling device 31 can be put into operation, expediently via a further switch S3 in series with switch S2. It has been found that the rest position of the handling device, indicated by solid lines, fulfills a dual purpose. Because the gripping arm 32 faces into the press during operation of the press 1, and lies predominantly or completely within the common contour lines formed by the contour lines of the press and of the handling device, it is ensured that the gripping arm 32 is not subjected to strong moments by vibration of the press 1, which would be the case if it were to project downward, for example on the opposite side (i.e. relative to FIG. 2). This must in no way entail obstruction of the press drive, as will be described below with reference to FIG. 3 and 4.

Another advantage is that, as a result, the loading of the elastic mount 14 (cf. FIG. 1) is more uniform, which is important for effective damping, because the handling device 31 in any case results in additional weight acting on the two stand legs 13 facing this device, so that it may be expedient to make the springs 14 stronger there than on the side which faces the entrance 17. Finally, the rest position described ensures that the handling device can begin to operate immediately after it is switched on, without first having to be brought to the tool 9 or 12.

After the handling device 31 has been switched on, a coordinated movement of the sliding drive and of the swivel drive begins, this movement being such that the gripper 38 provided on the end of the gripping arm 32 moves within a path extending approximately along a straight line L (with the slight deviations shown in FIG. 2). Thus, the swivel axle 39 of the gripping arm 32 is displaced along the sliding guide 30 to the position 39', while the gripping arm 32 swivels to the position 32', so that the tool 9 which it grips remains on the line L, exactly in the middle between the stand parts 36. Thus, in spite of cramped conditions and a very simple and robust construction of the handling device, the tool 9 or 12 can be pulled out or lifted out. At the end of the movement, the tool 9 is in a tool-removal position 9'', while the handling device 31 has reached position 31'' along the sliding guide 30, and the gripping arm assumes the position 32''.

Here, it can be seen that the arrangement of the tool magazine in compartment 20 is optimum in that the gripping arm 32 in the tool-removal position 32'' is parallel to the sliding guide 30, so that, on the one hand, the tool 9 can pass close to the stand legs 36 for positioning and, on the other hand, the tool furthermore does not project to such an extent beyond the press stand that it hinders operators or even requires an extension of the sound-insulating housing 15.

The control required for coordinating these movements is a program control of any type which is known per se. If the control is a step control, the range can be found with a minimum of position transducers, since each position depends on the number of steps from the start of the program.

Hence, if in the course of operation the handling device is driven from the tool-removal position 31'' to the right (based on FIG. 2) along the sliding guide 30, it finally reaches a tool transfer position 31'''. However, the orifice 29 must be opened beforehand, i.e. the door 27 must be moved to the position shown in FIG. 1. For this purpose, the cylinder unit control can be coupled with the step control, so that, in the step, the handling device 31 assumes a position in which the tool is just before the door 27 and at the same time the door 27 is opened. However, it is also possible for a position transducer, for example having a light source 40 and a photodetector 41, to be assigned to a control for the door 27, which is separate from the control 37, the door 27 being opened when the tool 9, the gripping arm 32 or the body of the handling device 31 passes through the beam of the light source 40.

The tool magazine inside compartment 20 is expediently in the form of a lift control, so that the pallets 24 always assume predetermined positions and the tool is thus reliably positioned on it (cf. the tool transfer position in FIG. 1). If particularly heavy tools weighing up to one metric ton are to be moved, the spring system 14 may constitute a critical source of problems. On the other hand, it is important that the handling device itself is not subjected to excessively great shocks, and it is for this reason that the elastic mounting is also expedient when the press in question is not a high-speed punch press; the elastic mounting can be provided between the frame 7 and the bearing element 30. The problem therefore arises as to how it is possible on the one hand to provide an elastic mounting and on the other hand to avoid its potential disadvantageous effects if it is in fact necessary to handle such heavy tools.

The solution may be the locking means shown in FIG. 1, which is in the form of a balance locking system and, if desired, prevents an (elastic) movement of the frame and hence of the bearing element 30 together with handling device 31 and provides securing so that the gripping arm 32 always assumes a transfer position 32''' at a height which corresponds to the position of a pallet 24.

The locking means may be designed so that cylinder units 42 are provided between the floor and the legs 13 of the stand 7 which are elastically held by the springs 14, the pistons 43 of the said cylinder units assuming the position shown in FIG. 1 during operation of the press 1. Cylinder units 42 of this type can be provided on two legs 13 only on the side facing the handling device 31, or on all legs of the frame 7. Each piston 43 has a piston rod 44 which, outside the cylinder 42, has a supporting surface 46 which is directed toward an extension 45 of the associated stand leg 13 and from which, expediently (but not necessarily), a guide pin 47 projects upward and passes through a guide orifice in extension 45. If the press 1 is switched off by opening switch S1 (FIG. 2), and switch S2 is closed, the solenoid of a solenoid valve MV can be energized by control device 37 immediately or (preferably) only after switch S3 has been switched on. In the position of solenoid valve MV shown, a line 49 intended to connect the cylinder units 42 to a pressure medium source 50 is interrupted. If, on the other hand, the solenoid valve moves to the right (based on FIG. 1), the pressure medium source 50 is connected, with the result that the pistons 43 move upward. Their supporting surfaces 46 then rest against the underneath of the extension 45 and thus directly support the legs 13, so that the springs 14 are relaxed. This locks the legs 13, which can no longer execute any elastic movement, the height of the transfer position 32''' of the gripping arm 32 being fixed.

Expedient forms of the handling device 31 are discussed below with reference to various embodiments (a) to (f), which are shown in various FIG. 3 and 4, parts having the same functions possessing the same reference symbols, but with an additional hundreds digit.

Figure 3A:
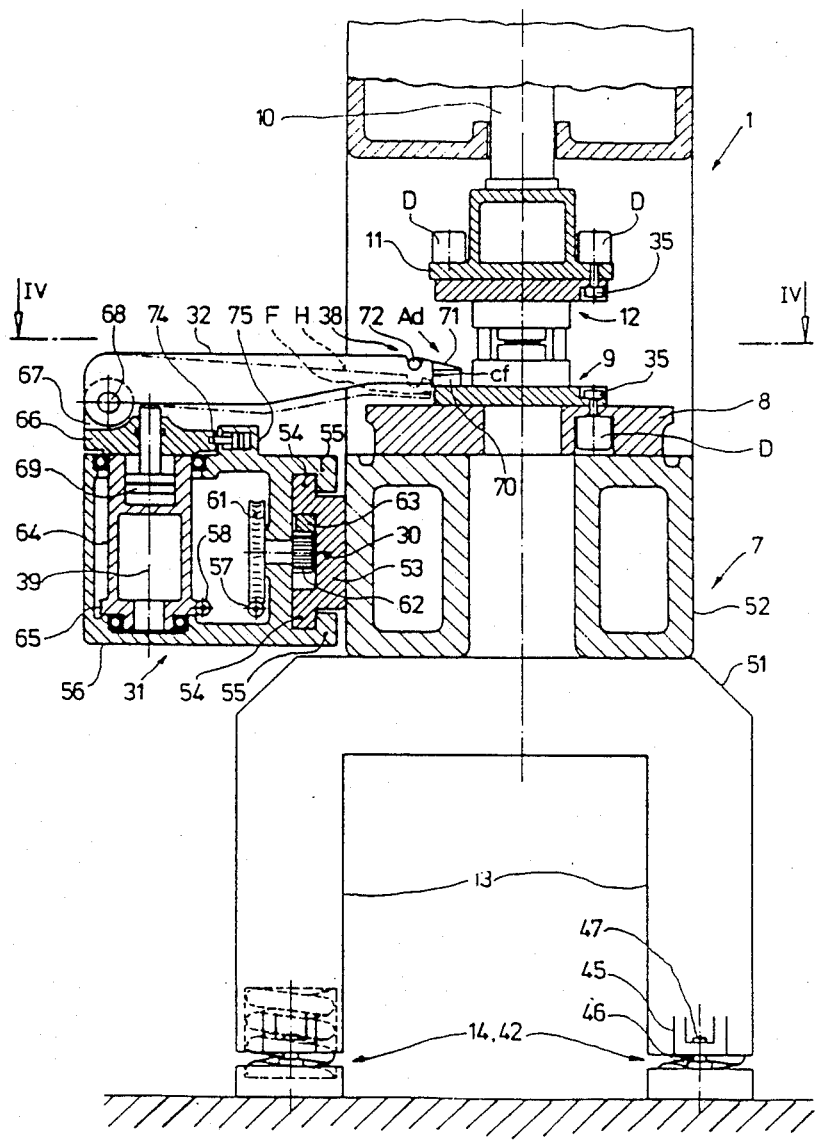
FIG. 3a to 4e show various embodiments of the handling device, the lower case letters each denoting associated views of an embodiment, and each
Figure 4A:
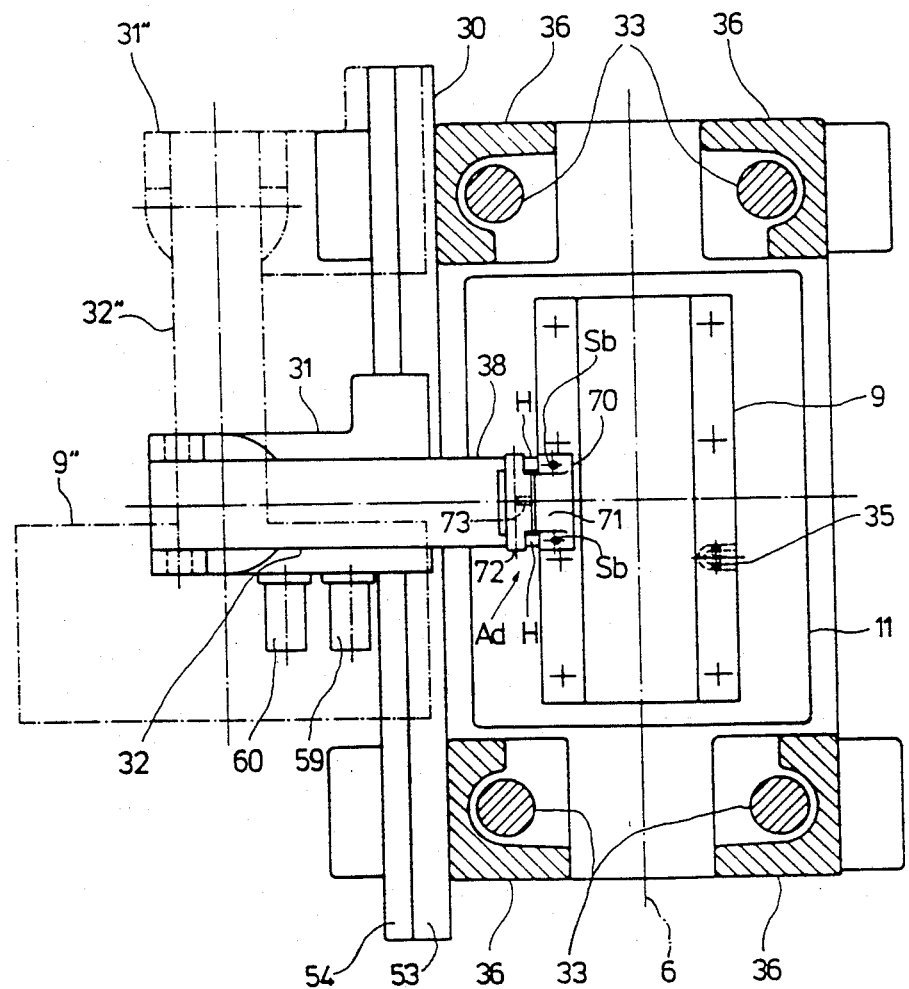

In embodiment (a) according to FIG. 3a and 4a, it can be seen that the stand 7 consists of a frame 51, provided with legs 13, and a bearing block 52. The drives D arranged in the holding apparatus 8 or 11 and intended for the clamping jaws 35 (shown here engaging recesses in the tool) are also illustrated, although only one of these clamping jaws is shown in each case.

Furthermore, it can be seen that the bearing element 30 is in the form of a T guide and that T-shaped extensions 54 therefore project upward and downward from a fastening element 53 connected to the bearing block 52. These elements 54 are encompassed by guide projections 55 of the handling device 31. The projections 55 project from a housing 56 in which the drive parts of the handling device 31 are housed. Although, for the sake of complicity, a sliding guide system 54, 55 is shown here, rollers can, if desired, be provided on individual surfaces.

For the displacement drive of the handling device for movement along the sliding guide 30 (see the above description for FIG. 1 and 2), the housing 56 may contain its own motor, in which case, however, it must be provided with its own power supply cable. It is more advantageous to drive a continuous spindle in the form of a lathe by means of a stationary motor. Such a spindle could be the spindle 57 (FIG. 3a). On the other hand, this spindle 57 and a similar spindle 58 may each be driven by a drive unit 59 or 60, respectively (FIG. 4a).

The spindle 57 engages a gear wheel 61 which is mounted in housing 56 and on whose axle a pinion 62 engages a toothed rack 63 provided on the sliding guide 30. Thus, the displacement is produced by driving in this manner.

To achieve the swivel movement described above, about the swivel axis 39 (cf. FIG. 2), a hollow shaft 64 is provided which possesses, at its lower end, a gear wheel 65 which engages the spindle 58. At its upper end, the hollow shaft 64 carries a rotary table 66, which is provided with bearing plates 67 for holding a swivel axle 68 running in the plane of the holding apparatuses 8, 11 are parallel to these. Thus, the gripping arm 32 can be swivelled upward and downward about the axle 39 on the one hand and about the horizontal axle 68 on the other. To achieve this upward and downward movement, a piston 69 is displaceable inside a hollow shaft 64, pressure medium from a pressure source, for example the source 50 (FIG. 1) being fed, in a manner which is not shown, to the said piston, under control by controller 37.

In addition to these drives, one or more drives for the gripper 38 itself are frequently also provided in conventional handling devices, which —in a conventional embodiment —would necessitate very heavy gripper claws. For this reason, a different path has been pursued here.

To save the tool manufacturer the trouble of having to produce special gripping surfaces for the gripper, expediently prefabricated adapters Ad are firmly screwed to the tool 9 by means of screw bolts Sb (most clearly visible in FIG. 4a). Each adapter Ad consists of a fastening part 70, a neck part 71 and a bracket part 72. Since —as is particularly evident from FIG. 1 and the tools in compartment 20 —the tools can have different dimensions, to compensate for this either adapters in which the neck parts 71 have different lengths are provided and kept in stock, or the length of the neck part is adjustable, for example by the bracket part 72 being connected to the neck part 71 via a bolt 73 shown by a dashed line, for example a screw bolt, along which length adjustment is possible. In this way, the length of the neck part 71 can be adjusted so that the bracket part 72 (regardless of the width of the tool 9) always reaches the same position. This makes it possible to avoid having to equip the gripper 38 with a complicated sensor control which first has to detect the approach toward the bracket or a gripping surface of the tool in order to control further movement of the gripper.

The gripper 38 can therefore have an extremely simple design and, in the embodiment (a) shown, consists simply of at least one (two) hooks H arranged in the form of a fork. Thus, if the handling device is brought into use for the first time, the rotary table 66 is brought into a position such that the gripper arm points straight toward the adapter Ad, as shown in FIG. 4a. Either the associated motor 60 is in the form of a stepping motor, in which case this position can be approached very precisely but by expensive means, or a cheap, conventional motor 60 is used, in which case it is expedient to provide a lock. This may be effected by a method in which the rotary table 66 possesses a certain degree of rotational movement with respect to the hollow shaft 64 and is finally brought into the correct position by a wedge lock 74 which is actuated, for example, by a piston/cylinder unit 75. Additionally or alternatively, a displacement transducer can be provided for the rotary table, for example the motor 60 being switched off only when the lock 74 has fallen into the associated funnel-shaped (in plan view) recess of the rotary table 66. In this case, the rotary table 66 can be rigidly connected to the hollow shaft 64.

During this swivel operation, the piston 69 assumes its lowest position, so that the hook H occupies the dash-dot position shown in FIG. 3a and is swivelled underneath the bracket part 72. As soon as the lock 74 has entered the associated recess of the rotary table 66, pressure medium is admitted under the piston 69 so that the said piston rises until the gripping arm 32 assumes the position shown by solid lines in FIG. 3a, the hook H gripping the bracket 72.

The gripping arm 32 rests on the piston rod of piston 69 only under its own weight. There is of course the danger of constant vibration during operation of the press 1, with production of noise and the risk of knocking out the swivel bearing on the axle 68. It is therefore expedient if the gripping arm 32 in its rest position, i.e. during operation of the punch press 1, is clamped to a stationary part. This may be any part of the press, although the gripping arm 32 is preferably clamped directly to the bracket part 72, so that no special means are required. This means that the piston 69 is held in its upper position under pressure during operation of the press. This can be effected either by providing, for the valve controlling the pressure medium feed (not shown), a shunt line to switch S2 for control, or if this valve, when its solenoid is in the non-energized state, connects the pressure medium source 50 to the underneath of the piston 69.

Another problem is that, with a simple gripper 38 of this type, the tool 9 (together with the tool 12 on top) can only be gripped on one side if expensive constructions for a second point of access are avoided. The tool thus exerts a considerable torque on the gripping arm 32 and especially on the gripper 38 itself.

In order to take up this torque, it is expedient to provide the gripper 38 with at least one supporting surface F, with which it can support itself on a corresponding supporting surface cf of the tool, preferably of the adapter. As shown in FIG. 3a, the supporting surface F of the gripper 38 is located on its front face, whereas the corresponding supporting surface cf on the fastening part 70 of the adapter Ad is located opposite it. If adapters with an adjustable neck part 71 were used, the corresponding supporting surface would either likewise have to be adjustable or connected to the bracket part 72, from which it would have to be separated by an appropriate, predetermined distance in order to be supported on the gripper 38. Nevertheless, it is clear from the further embodiments (b) to (e) that a large number of different arrangements of the supporting surface F are possible.

Figure 3B:
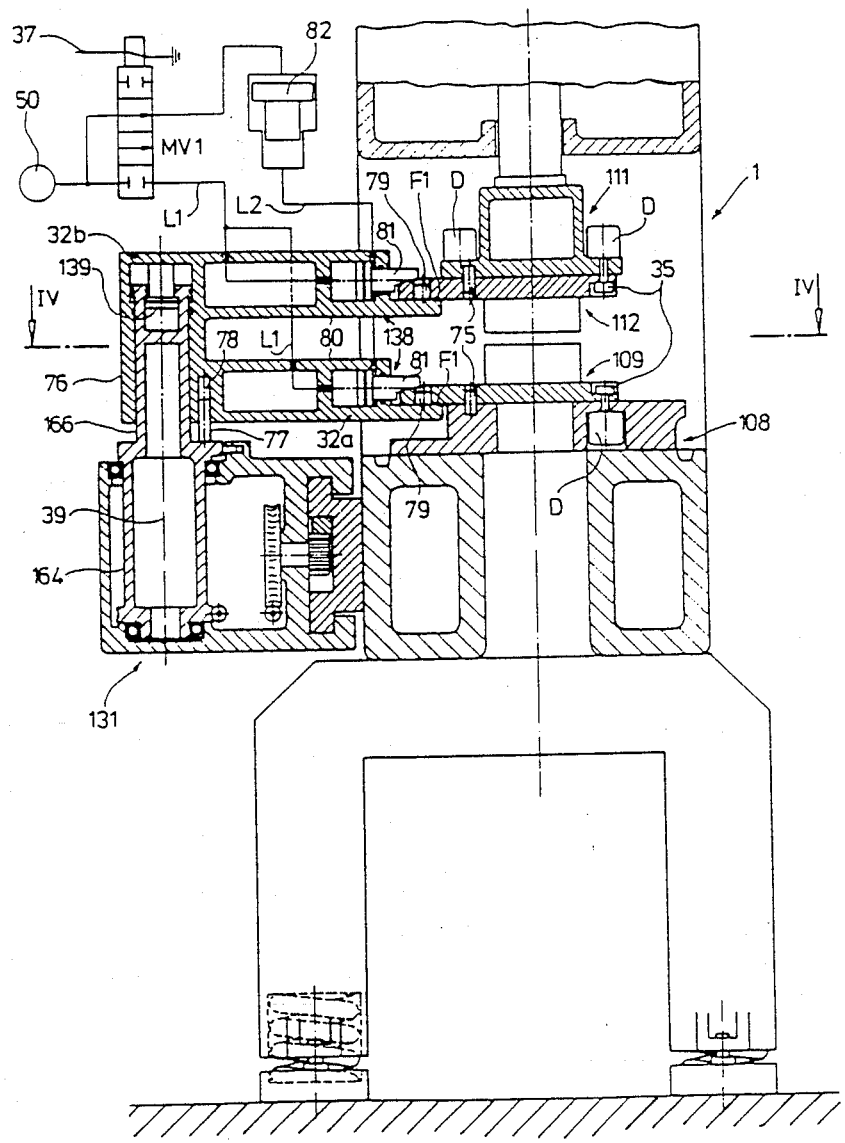
Figure 4B:
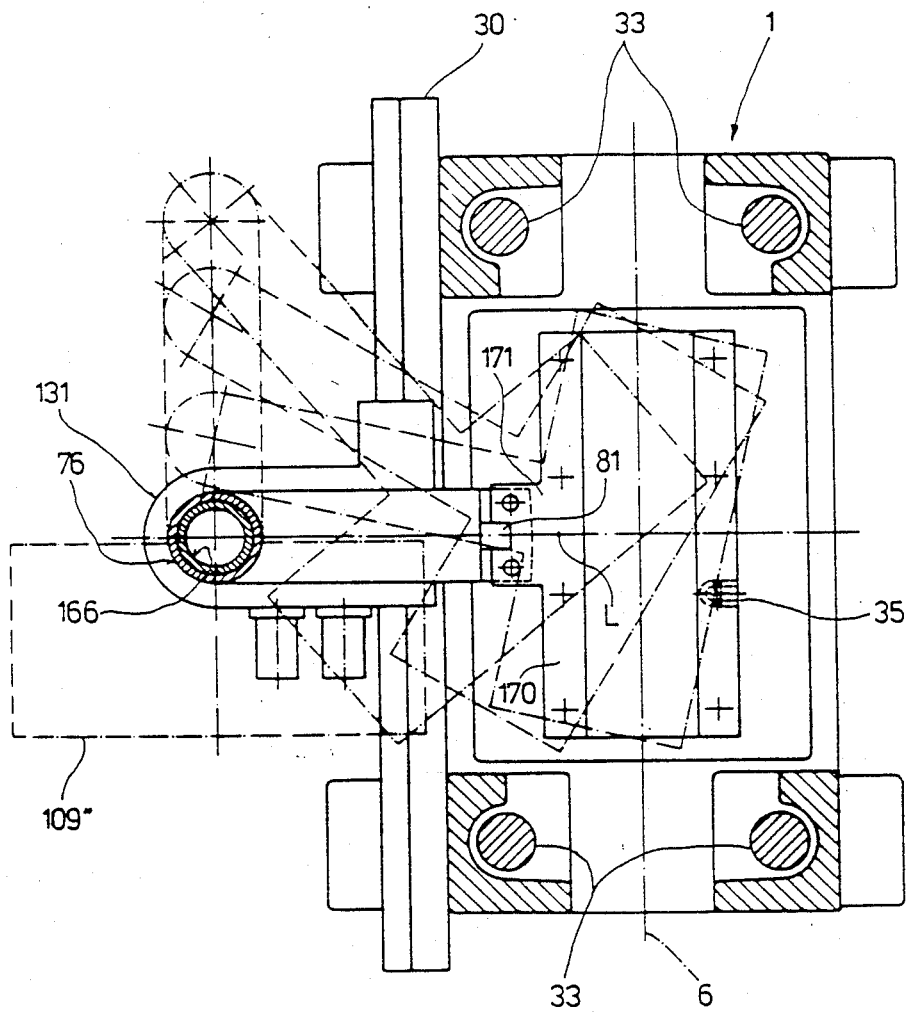
Figure 4E:
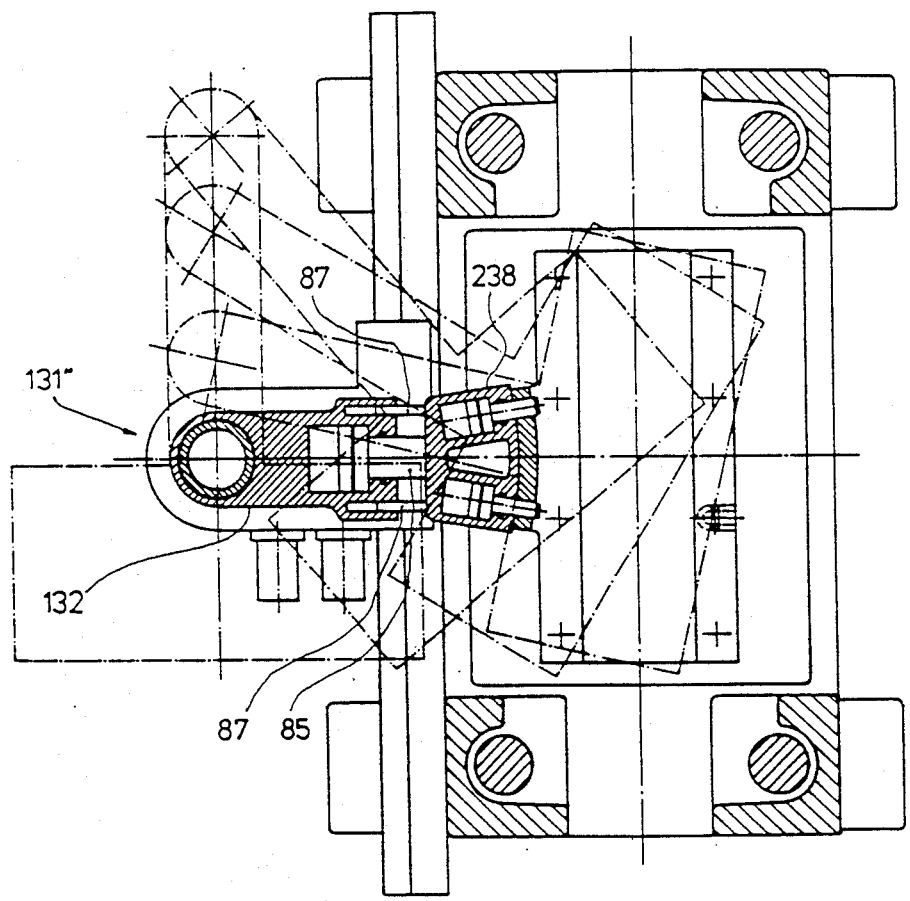

For embodiment (b) according to FIG. 3b and 4b, the example chosen is once again press 1, on which, however, a variant 131 of the handling device can be seen. The object here is to grip two tools 109, 112 separately from one another with the aid of two gripping arms 32a, 32b arranged one on top of the other, if for any reason it is not intended to place these tools one on top of the other and transport them together.

In embodiment (b) the tools 109 and 112 have a somewhat different form to the tools 9 and 12, as do the associated holding apparatuses 108, 111. The latter in fact possess centering spindles 75 which pass through corresponding holes in the tools 109, 112 and, on the opposite side, engage the clamping jaws 35 already described. If necessary, the centering spindles may be assigned drives in order to retract them into the holding apparatus 108 or 111.

The two gripping arms 32a, 32b are fastened rigidly to a common support 76 and can be displaced, together with this, by a piston 139 along a tubular extension 166 of the hollow shaft 164. In order to avoid tilting, a sliding guide 77 arranged radially outside the support can be provided. In order not to hinder the rotational movements about the axle 39, and to avoid having to disengage the support from the guide 77 before carrying out the rotational movement, the said guide can be in the form of a cylindrical wall part which engages a correspondingly shaped recess 78 in the support 76 if the guide 77 were arranged on the handling device 131; however, the construction is simplified if —as shown —the said guide rotates with the hollow shaft 164, so that a simple pin 77 is sufficient.

The form of the two grippers 138 also differs from that of embodiment (a). Here, a horizontal supporting surface F1 is provided, and may be relatively large. Furthermore, a projection, tooth, or the like, 79 which engages an orifice in the tool 109 or 112 can project from this supporting surface. A wedge 81 which can be displaced by a cylinder unit 80 interacts with each of these supporting surfaces F1 and thus presses the tool 109 or 112 firmly against the supporting surface F1.

If the tool 109 or 112 is firmly clamped between supporting surface F1 and wedge 91, vibrations during transportation —but particularly when the gripping arms 32a, 32b are firmly clamped in their rest position on tool 109, 112 in order to avoid vibration of the arms —can readily result in the wedges 81 seizing with the corresponding surface of the tool. Furthermore, the piston surface of the units 80 is reduced on the side facing the wedges 81 by the latter, so that the force to be applied for release would be smaller than the force required for clamping. This can be avoided if the piston surface on the side facing away from the wedges is also reduced, for example by mounting at that point a piston rod which has about the same diameter as the diameter of the wedges 81 or an even greater one.

In FIG. 3b, however, a different solution has been applied, which, in a simple manner, permits a greater force to be applied for release than for clamping. Moreover, the units 80 are connected to the pressure medium source 50 via lines L1, L2 and via a solenoid valve MV1. While the lines L1 run directly to that side of the units 80 which faces away from the wedges 81, an amplifying piston 82 is inserted in lines L2, this piston amplifying the pressure generated by source 50 and used to effect release.

FIG. 4b shows, in plan view, the manner in which a wedge 81 grips the tool at a projecting part. It can be seen from this figure that the projecting part can possess, as adapter Ad1, a fastening part 170 and a neck part 171, a bracket part being absent in this case. Furthermore, this figure once again clearly shows the coordinated displacement and rotational movement of the handling device 131 and its gripping arms 32a, 32b, until the tool (only tool 109 is visible) has been drawn out between the guide columns 33 and into the tool-removal positon 109".

At this point, it may be stated that the handling device can, if desired, also be used for handling workpieces, although, as a rule, this is not necessary. In particular, a handling device 131 according to embodiment (b) could be used for this purpose, because clamping by means of the wedges 81 is also suitable for the punch sheets 6. For example, the handling device 131 could have a workpiece removal position at the lower end (based on FIG. 4b) of the guide 30. It may also be mentioned that, although the transfer position shown in FIG. 1 and 2 constitutes a particularly advantageous embodiment, the gripping arm, in order to reach the transfer position, could also swivel from the position 31" (FIG. 2) of the handling device toward the door 16, in order to place the tool there on a trolley travelling past outside the soundinsulating housing 15. However, such trolleys which run on rails should be avoided as far as possible, and of course such a widely sweeping swivel movement of the gripping arm requires increased care on the part of the operator.

Figure 3C:
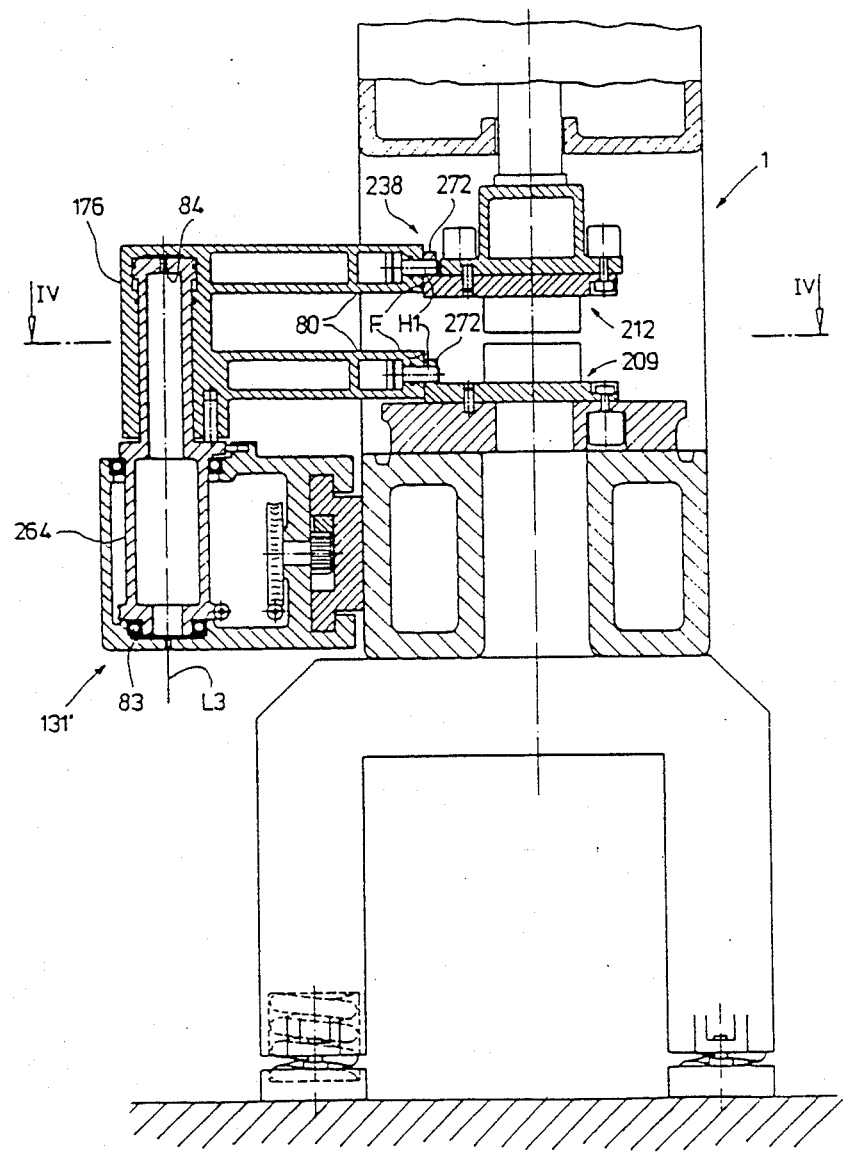
Figure 3D:
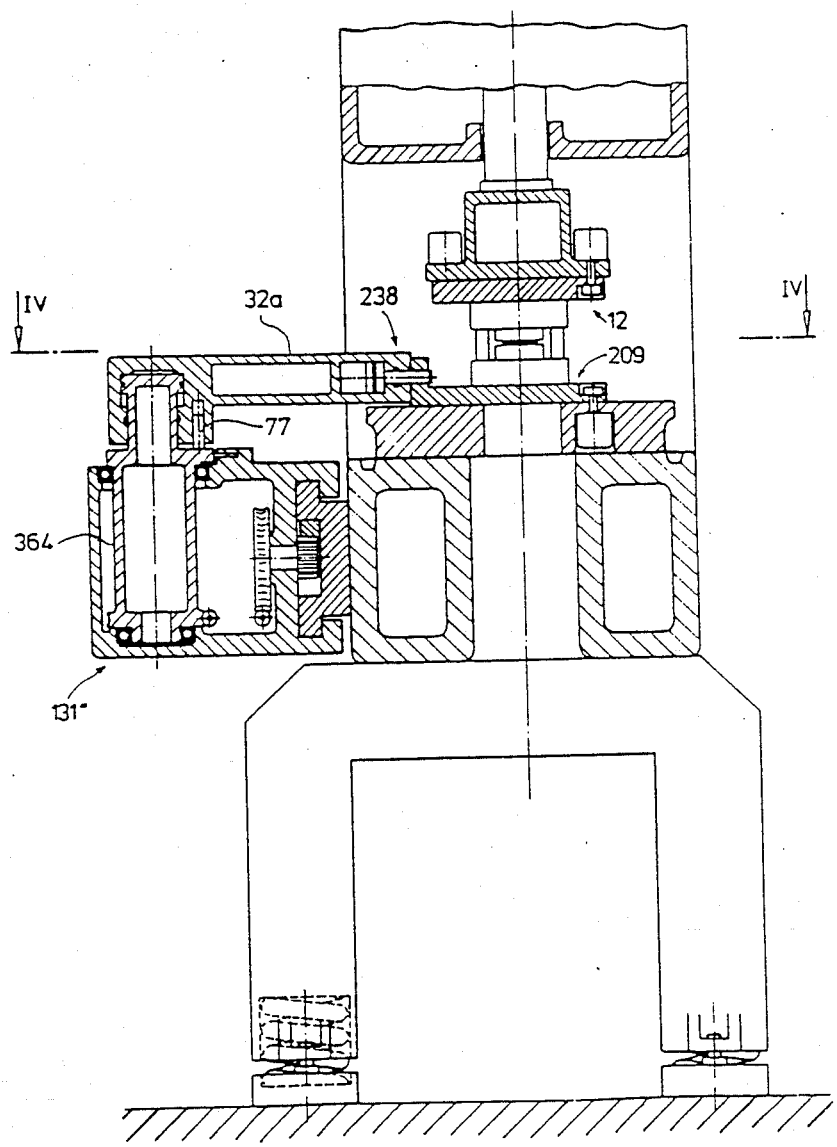
Figure 3E:
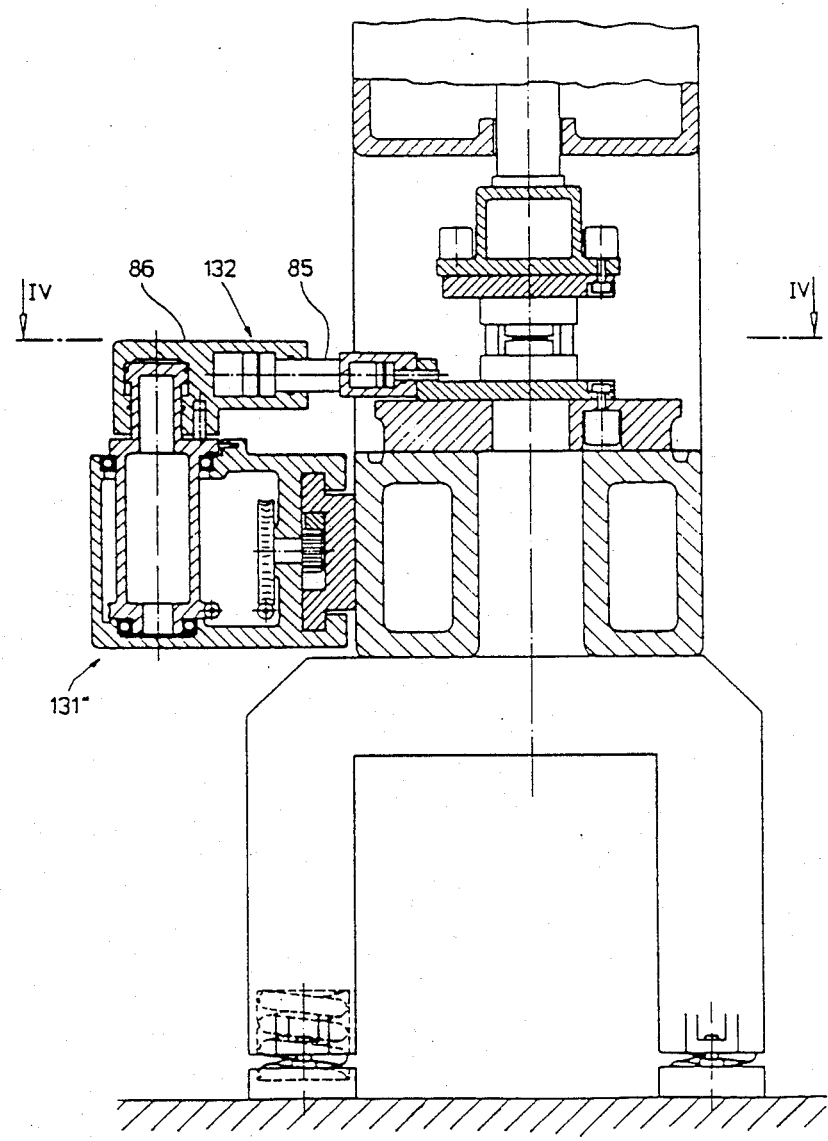

FIG. 3c and 3d show embodiments (c) and (d), for which FIG. 4c/d shows a section along the line IV—IV of FIG. 3c and 3d.

FIG. 3c resembles FIG. 3b in that, in this case too, two gripping arms 32a, 32b located one on top of the other are provided. The common support 176 need not execute any vertical movement at all if the tools 209, 212 are always at the same height, especially since the gripper 238 is specially designed for this purpose. If, nevertheless, a vertical movement of the support 176 is desired, a piston 139 is not absolutely essential (FIG. 3b). A line L3 may be laid from the pressure medium source 50 (cf. FIG. 1) to the lower end of the hollow shaft 264, which in this case is expediently sealed at its bearing 83, in a manner not shown. At the upper end, the pressure then acts directly on the support 176 via an orifice 84.

Instead of the hook H, a hook-like spindle H1 is provided here, and can be operated by the units 80 were disclosed in FIG. 3b. Here, however, the absence of a wedge action makes the amplifying piston 82 unnecessary. However, as shown in FIG. 4c/d, each gripping arm 32a or 32b has a pair of units 80 for operating spindles H1, H1'. The tools 209, 212 either themselves have projections of this type, or in each case an adapter Ad2 shown in FIG. 4c/d and comprising a fastening part 270, a short neck part 271 (which may be dispensed with) and an angled bracket part 272 is provided, the said adapter being curved to form an arc shape with respect to the midpoint Mi. The axes of the spindles H1, H1' run in a radial direction toward this arc so that, after entering corresponding orifices 0, 0' of the bracket part 272, the spindles H1, H1' spread out behind the said bracket part. This makes it impossible for the connection thus achieved to be accidentally parted. Nevertheless, it is advantageous once again to provide, at the front end of the gripping arm 32a or 32b, a supporting surface F which takes up the torque exerted by the tools 209, 212 (FIG. 3c).

FIG. 3d shows the nature of the construction when both tools 209, 212 are transported, one on top of the other, by a single gripping arm 32a; with regard to the other parts, reference may be made to the above description.

An embodiment having a telescopic gripping arm 132 is advisable where space is particulary scarce; however, in order to keep the telescope length short, the coordination control described above and shown in FIG. 4e, by controller 37, can be used in this case too, although it would be possible per se to use a telescopic gripping arm 132 to achieve displacement in a straight line along the line L. Accordingly, the gripper 238, which otherwise corresponds to the embodiments (c) and (d), is located on a piston rod 85 of a cylinder unit 86, the guides 87 (or at least one of them) shown in FIG. 4e being assigned to the said piston rod to prevent it from rotating.

Within the scope of the invention, a large number of modifications and combinations of the features shown and described, with one another and with prior art features, are possible; for example, the two gripping tools H1, H1' according to FIG. 4c/d and 4e could also cooperate with a single, large bracket orifice common to both tools. Furthermore, such an embodiment of the gripping tools in which spreading is present is of course advantageous regardless of its application to press 1.

I claim:

1. In a high-speed, high-capacity press:
   means forming a support frame which stands on a base;
   a first tool holder on said support frame for firmly holding a tool by first connection means;
   a second tool holder on said support frame for firmly holding a counter-tool by second connection means;
   said first and second tool holders defining parallel planes;
   drive means for imparting relative to-and-fro movement to at least one of said tool holders, thereby transmitting vibrations to said support frame;
   bearing means rigidly attached on said support frame;
   a tool magazine receiving a plurality of tools and counter-tools and being arranged at a predetermined position with respect to said support frame;
   handling means guided on said bearing means for handling said tools and counter-tools, comprising:
   a displaceable body;
   at least one gripping arm having two ends and being movably mounted for movement about perpendicular axes on said body by one of its ends, whereas the other end freely projects away from said body, including gripper means on said freely projecting end for gripping said tool holders, and
   displacement drive means for said gripper arm and said body, said displacement drive means comprising lifting means to lift said gripping arm, when a tool holder is gripped, in order to raise the latter, said displacement drive means being operable to displace said handling means in a plane parallel to the planes of the holders and at right angles to their direction of movement, from a rest position to a position for transfer of said tool and counter-tool to said magazine, and between said rest position and said transfer position into at least one toolremoval position in which at least one of said tool and counter-tool is removable from the respective holder by loosening the respective means of connection.

2. A press as claimed in claim 1, wherein, in order to lift a tool from its tool holder, the gripper means can also be moved transverse to the plane of the said apparatus, and can be rotated about an axle parallel to the plane of the tool holder, and, in addition to a gripping tool, the gripper means has at least one supporting surface for taking up the torque exerted by the tool gripped on one side, which is vertical.

3. A press as claimed in claim 1, wherein the movement of the tool holders is guided in the vertical direction by guide means, and the handling means is mounted underneath the tool holders, on the support frame.

4. A pick-up apparatus for a tool to be used in a press as claimed in claim 2, which, as an adapter for handling different tools, has a fastening arrangement for the particular tool with at least one fastening surface, and wherein a holding bracket extends away from this fastening arrangement and after the tool has been fastened, runs parallel to its edge.

5. Apparatus as claimed in claim 4, wherein, in addition to the fastening surface, the fastening arrangement also has a counter-supporting surface, at right angles to the said fastening surface, for the supporting surface of the gripper.

6. A press as claimed in claim 1, wherein the handling means has at least one gripper with two gripping tools which can be spread in at least one orifice in the article to be picked up.

7. A press as claimed in claim 1, wherein at least one sliding guide is provided for the gripper means, the bearing means being in the form of a sliding guide which runs along the support frame and parallel to the plane of the tool holders.

8. A press as claimed in claim 7, wherein the gripping arm furthermore can be rotated about an axle parallel to the direction of movement of the tool holders which can be moved relative to one another, from a rest position projecting into the punch press, to a tool-removal position pointing at least approximately along the path of the sliding guide.

9. A press as claimed in claim 8, wherein a common controller means controls the sliding movement and rotational movement, and moves the tools essentially along a straight line between guide columns of the press into the toolremoval position.

10. In a high-speed, high-capacity press:
    means forming a support frame which stands on a base;
    a first tool holder on said support frame for firmly holding a tool by first means of connection;
    a second tool holder on said support frame for firmly holding a counter-tool by second means of connection;
    said first and second tool holders defining parallel planes;
    drive means for imparting relative to-and-fro movement to at least one of said tool holders, thereby transmitting vibrations to said support frame;
    bearing means rigidly attached on said support frame;
    a tool magazine for receiving a plurality of tools and counter-tools and being arranged at a predetermined position with respect to said support frame;
    handling means guided on said bearing means for handling said tools and counter-tools, comprising:
    a displaceable body;

at least one gripping arm having two ends and being movably mounted for movement about perpendicular axes on said body by one of its ends, whereas the other end freely projects away from said body, and including gripper means on said freely projecting end for gripping said tool holders, and displacement drive means for said gripper arm and said body, said displacement drive means comprising lifting means to lift said gripping arm, when a tool holder is gripped, in order to raise the latter, said displacement drive means being operable to displace said handling means in a plane parallel to the planes of the holders and at right angles to their direction of movement, from a rest position to a position for transfer of said tool and counter-tool to said magazine, and between said rest position and said transfer position into at least one tool-removal position in which at least one of said tool and counter-tool is removable from the respective holder by loosening the respective means of connection; and insulating wall means forming a housing surrounding said press to shield against noise emanating from said press, and said handling means, at least in its rest position, being also situated inside said housing.

11. An arrangement as claimed in claim 10, wherein said tool magazine is also surrounded by said insulating wall means.

12. In a press:

means forming a support frame which stands on a base;

a first tool holder on said support frame for firmly holding a tool by first means of connection;

a second tool holder on said support frame for firmly holding a counter-tool by second means of connection;

said first and second tool holders defining parallel planes;

drive means for imparting relative to-and-fro movement to at least one of said tool holders, thereby transmitting vibrations to said support frame;

bearing means rigidly attached on said support frame;

a tool magazine for receiving a plurality of tools and counter-tools and being arranged at a predetermined position with respect to said support frame;

handling means guided on said bearing menas for handling said tools and counter-tools, comprising:

a displaceable body;

at least one gripping arm having two ends and being movably mounted on said body by one of its ends, whereas the other end freely projects away from said body, and including gripper means on said freely projecting end for gripping said tool holders, and displacement drive means for said gripping arm and said body, said displacement drive means comprising:

lifting means to lift said gripping arm, when a tool holder is gripped, in order to raise the latter, said displacement drive means being operable to displace said handling means in a plane parallel to the planes of the holders and at right angles to their direction of movement, from a rest position to a position for transfer of said tool and counter-tool to said magazine, and between said rest position and said transfer position into at least one tool-removal position in which at least one of said tool and counter-tool is removable from the respective holder by loosening the respective means of connection; and clamping means for firmly connecting said gripping arm, in its rest position, to said support frame.

13. A press as claimed in claim 12, wherein said clamping means is formed by means in said displacement drive means for tensionally connecting said gripping arm, in its rest position, to said support frame.

14. In a high-speed, high-capacity press;

means forming a support frame which stands on a base;

a first tool holder on said support frame for firmly holding a tool by first means of connection;

a second tool holder on said support frame for firmly holding a counter-tool by second means of connection;

said first and second tool holders defining parallel planes;

drive means for imparting relative to-and-fro movement to at least one of said tool holders, thereby transmitting vibrations to said support frame;

a tool magazine for receiving a plurality of tools and counter-tools and being arranged at a predetermined position with respect to said support frame;

bearing means rigidly attached on said support frame;

handling means guided on said bearing means for handling said tools and counter-tools, comprising:

a displaceable body;

at least one gripping arm having two ends and being movably mounted for movement about perpendicular axes on said body by one of its ends, whereas the other end freely projects away from said body, and including gripper means on said freely projecting end for gripping said tool holders, and displacement drive means for said gripper arm and said body, said displacement drive means comprising lifting means to lift said gripping arm, when a tool holder is gripped, in order to raise the latter, said displacement drive means being operable to displace said handling means in a plane parallel to the planes of the holders and at right angles to their direction of movement, from a rest position to a position for transfer of said tool and counter-tool to said magazine, and between said rest position and said transfer position into at least one tool-removal position in which at least one of said tool and counter-tool is removable from the respective holder by loosening the respective means of connection, and said at least one gripping arm, in the rest position, being substantially within an outer contour line defined by the cross-section of the press and the bearing means for the handling means.

15. In a high-speed, high-capacity press:

means forming a support frame which stands on a base;

a first tool holder on said support frame for firmly holding a tool by first connection means;

a second tool holder on said support frame for firmly holding a counter-tool by second connection means;

said first and second tool holders defining parallel planes;

drive means for imparting relative to-and-fro movement at a frequency of at least 500/min. to at least one of said tool holders, thereby transmitting vibrations to said support frame;

bearing means rigidly attached on said support frame;

a tool magazine receiving a plurality of tools and counter-tools and being arranged at a predetermined position with respect to said support frame;

handling means guided on said bearing means for handling said tools and counter-tools, comprising;

a displaceable body;

at least one gripping arm having two ends and being movably mounted for movement about perpendicular axes on said body by one of its ends, whereas the other end freely projects away from said body, including gripper means on said freely projecting end for gripping said tool holders; and displacement drive means for said gripper arm and said body, said displacement drive means comprising lifting means to lift said gripping arm, when a tool holder is gripped, in order to raise the latter, said displacement drive means being operable to displace said handling means in a plane parallel to the planes of the holders and at right angles to their direction of movement, from a rest position to a position for transfer of said tool and counter-tool to said magazine, and between said rest position and said transfer position into at least one tool-removal position in which at least one of said tool and counter-tool is removable from the respective holder by loosening the respective means of connection.

16. In a press:

means forming a support frame which stands on a base:

a first tool holder on said support frame for firmly holding a tool by first means of connection;

a second tool holder on said support frame for firmly holding a counter-tool by second means of connection;

said first and second tool holders defining parallel planes;

drive means for imparting relative to-and-fro movement to at least one of said tool holders, thereby transmitting vibrations to said support frame;

bearing means rigidly attached on said support frame;

a tool magazine for receiving a plurality of tools and counter-tools and being arranged at a predetermined position with respect to said support frame;

handling means guided on said bearing means for handling said tools and counter-tools, comprising:

a displaceable body;

at least one gripping arm having two ends and being movably mounted on said body by one of its ends, whereas the other end freely projects away from said body, and including gripper means on said freely projecting end for gripping said tool holders; and displacement drive means for said gripper arm and said body, said displacement drive means comprising lifting means to lift said gripping arm, when a tool holder is gripped, in order to raise the latter, said displacement drive means being operable to displace said handling means in a plane parallel to the planes of the holders and at right angles to their direction of movement, from a rest position to a position for transfer of said tool and counter-tool to said magazine, and between said rest position and said transfer position into at least one toolremoval position in which at least one of said tool and countertool is removable from the respective holder by loosening the respective means of connection; and elastic support means for elastically supporting said handling means with respect to said base.

17. A press as claimed in claim 16, wherein said elastic support means is connected to both said handling means and said support frame for also elastically supporting the support frame with respect to said base.

18. A press as claimed in claim 16, further comprising locking means for stiffening said elastic support means to suppress elastic movement.

* * * * *